United States Patent

[11] 3,596,546

| [72] | Inventor | John L. van den Kieboom<br>St. Clair Shores, Mich. |
|---|---|---|
| [21] | Appl. No. | 759,081 |
| [22] | Filed | Sept. 11, 1968 |
| [45] | Patented | Aug. 3, 1971 |
| [73] | Assignee | La Salle Machine Tool, Inc.,<br>Warren, Mich. |

[54] MACHINE TOOL RESETTING APPARATUS
3 Claims, 5 Drawing Figs.

| [52] | U.S. Cl. | 82/24 |
|---|---|---|
| [51] | Int. Cl. | B23b 21/00 |
| [50] | Field of Search | 82/24, 5, 2.5 |

[56] References Cited
UNITED STATES PATENTS

| 2,632,332 | 3/1953 | Biggert, Jr. | 82/24 X |
| 2,986,055 | 5/1961 | Kasselmann | 82/24 X |
| 3,010,348 | 11/1961 | Swanson et al. | 82/2.5 |
| 3,111,050 | 11/1963 | Ciccarelli | 82/5 |

*Primary Examiner*—Leonidas Vlachos
*Attorney*—Olsen and Stephenson

ABSTRACT: Apparatus for periodically moving a machine tool, such as a cutting tool, to compensate for tool wear and automatically maintain a preestablished position of the tool within predetermined tolerance limits. In response to a signal indicating the necessity for resetting the cutting tool to compensate for wear, a cam and cam follower structure are actuated to provide for adjustable movement of the tool through a predetermined incremental distance. The cam and cam follower structure are arranged to prevent automatic adjustment of the tool beyond a predetermined limit, and a signal is given when this predetermined limit is reached so that the apparatus of this invention can be reset.

INVENTOR
JOHN L. VAN DEN KIEBOOM

BY
*Olsen and Stephenson*
ATTORNEYS

3,596,546

MACHINE TOOL RESETTING APPARATUS

CROSS REFERENCE TO RELATED APPLICATION

This application relates to the same general type of resetting apparatus disclosed in copending application Ser. No. 583,189 filed Sept. 30, 1966 and assigned to the assignee of this application and now U.S. Pat. No. 3,449,986.

BACKGROUND OF THE INVENTION

Continual wear of a machine tool, such as a cutting or turning tool, must be taken into account where a machine is set to continuously machine like parts to predetermined dimensions. The general practice in the past has been to manually measure, at periodic intervals, workpieces which have been subjected to the operation of the tool. When a workpiece was oversized, more than the allowed tolerance, the machine was shut down and the position of the tool was manually adjusted to bring subsequently machined parts within the allowable tolerances. One or more trial cuts were made with the tool and additional tool adjustments and trial cuts were made where necessary. This manual adjustment procedure is objectionable for obvious reasons. The above referenced patent application discloses apparatus providing for automatic adjustment of the tool to compensate for wear. This application relates to an improved structure for automatically resetting the tool to compensate for wear.

SUMMARY OF THE INVENTION

In the improved tool resetting apparatus of this invention, the cutting tool is mounted on a support which is partially split so that it has a fixed section and a section which can be deflected relative to the fixed section. The tool is mounted on the deflectable section so that when this section is deflected, the tool will be moved very small distances in a direction toward the work to adjust the tool position to compensate for wear. The apparatus includes a fixed body and a plunger mounted on the body and engaged with the deflectable support section. The plunger is mounted for axial sliding movement to deflect the deflectable support section in the direction of the work. A spindle is rotatably mounted on the fixed body and coacting cam and cam follower means are provided on the spindle and the plunger so that in response to rotation of the spindle the plunger is moved axially. A rotatable drive member is mounted in the fixed body and a one-way clutch is extended between the drive member and the spindle so that when the drive member is rotated, the spindle is rotated to in turn advance the plunger. A fluid-actuated jogging structure is provided for automatically rotating the drive member through a predetermined acute angle in response to a signal that compensation for tool wear is required.

The coacting cam and cam follower means is constructed so that it cannot advance the plunger more than a predetermined distance, and an indicator is provided for visually indicating this condition. As a result, the split support cannot be overdeflected.

Further objects, features and advantages of this invention will become apparent from a consideration of the following description, the appended claims, and the accompanying drawing in which:

Figure 1:
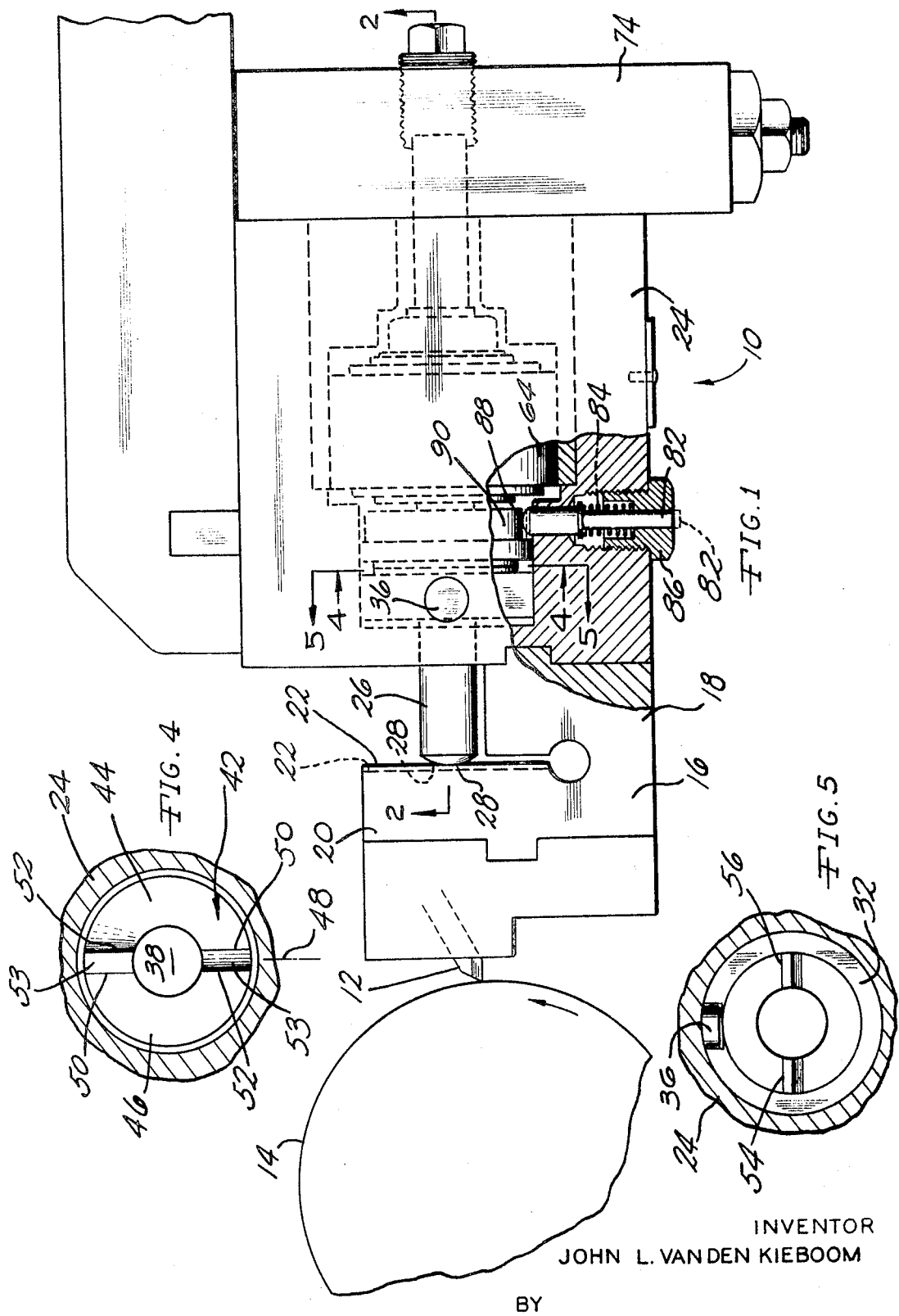
FIG. 1 is an elevational view of the apparatus of this invention shown in assembly relation with a cutting tool and a fragmentary portion of a workpiece, with some parts broken away and other parts shown in section for the purpose of clarity.
Figure 3:
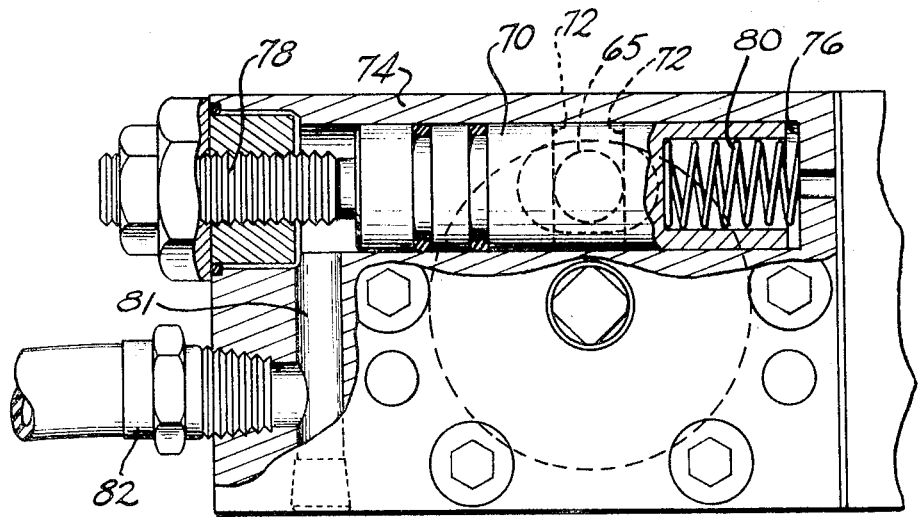

FIG. 3 is an end view of the apparatus of this invention with some parts broken away and other parts shown in section for the purpose of clarity; and FIGS. 4 and 5 are fragmentary sectional views of the apparatus of this invention as seen from substantially the lines 4–4 and 5–5, respectively, in FIG. 1.

Figure 2:
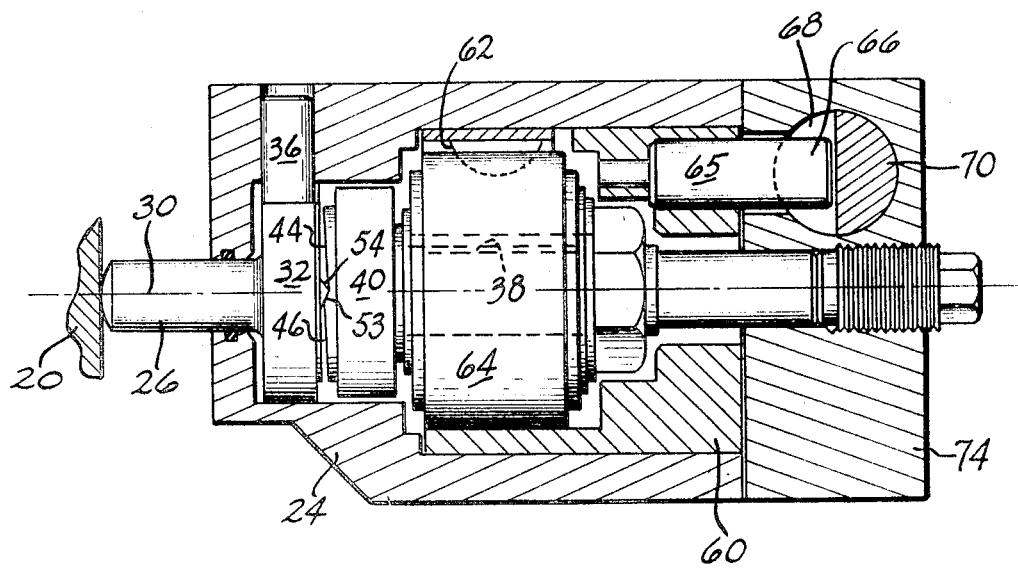
FIG. 2 is a transverse sectional view of the apparatus of this invention as seen from substantially the line 2–2 in FIG. 1.

With reference to the drawing, the apparatus of this invention, indicated generally at 10, is illustrated in FIG. 1 in assembly relation with a cutting tool 12 positioned for turning a workpiece 14 and supported on a support 16. As shown in FIG. 1 the support 16 is partially split so that it has a fixed section 18 and a deflectable section 20 provided with an abutment surface 22. The apparatus of this invention includes a fixed body 24 secured to the fixed support section 18 and a plunger 26 having a working end 28 engaged with the deflectable support section abutment surface 22. The plunger 26 is slidably supported in the body 24 for movement along its longitudinal axis 30, as shown in FIG. 2. At its inner end, the plunger 26 has an enlarged section 32 which is generally cylindrical but which has a slot 34 (FIG. 5) into which a radially extending stop pin 36 carried by the body 24 extends so that the pin 36 prevents rotation of the plunger section 32.

A spindle 38 is rotatably mounted in the body 24 in a coaxial relation with the plunger 26. At its forward end the spindle 38 has an enlarged section 40 positioned adjacent the plunger section 32. As shown in FIG. 4, the spindle section 40 is formed with a cam surface 42 which is generally perpendicular to the axis 30. The surface 42 is divided into half sections 44 and 46 which are disposed on opposite sides of an imaginary diameter 48 extending through the axis 30. Each of the sections 44 and 46 is generally arcuate in shape and is configured so that it has a low end 50 and a high end 52. By "low" and "high" is meant that the end 52 is spaced in a direction along the axis 30 closer to the tool support abutment surface 22 than is the end 50. At the juncture of the high end 52 of each cam section with the low end of the other cam section, steeply inclined sections 53 are formed to avoid an abrupt dropping of a cam follower. The cam surface sections 44 and 46 are engaged by a pair of cam followers 54 and 56 (FIG. 5), respectively, formed on the plunger section 32 and projected toward the cam surfaces 44 and 46.

When the cam followers 54 and 56, which are approximately 180° apart with respect to the axis 30, are engaged with the low ends 50 of the cam surfaces 44 and 46, respectively, the working end of the plunger 28 is in the position shown in solid lines in FIG. 1. When the spindle 38 is rotated so as to move the cam surfaces 44 and 46 relative to the followers 54 and 56, so as to move the followers 54 and 56 along the surfaces 44 and 46 toward the high ends 52 thereof, the plunger 26 is moved in the direction of the abutment surface 22. As a result, when the cam surfaces 44 and 46 have been moved so that the cam followers 54 and 56 are located at the high ends thereof, the plunger 26 has been moved so that the working end 28 thereof has been moved to the broken line position illustrated in FIG. 1 in which the deflectable tool support section 20 has been moved from its solid line position shown in FIG. 1 to its broken line position to move the turning tool 12 a corresponding distance toward the work to compensate for tool wear.

In order to rotate the spindle 38, a drive member 60 (FIG. 2) is rotatably supported in the body 24 for rotation about the axis 30. The drive member 60 is secured, by means of a key 62, to a one-way clutch unit 64, of conventional construction, connected to the spindle 38. In a preferred embodiment of the invention, the one-way clutch unit 64 is of the well known "-form sprag type" assembled with the spindle 38 so that when the clutch unit 64 is rotated in a direction to rotate the cam surface 42 in a clockwise direction as viewed in FIG. 4, the spindle 38 will be rotated, but when the unit 64 is rotated in an opposite direction, the spindle 38 will not be rotated.

A drive pin 65, secured at one end to drive member 60 so that the pin 65 is parallel to but spaced from the axis 30, has its opposite end 66 disposed in a slot 68 formed in a piston 70 (FIG. 2). The slot 68 is of a width such that the opposite ends 72 of the slot form abutments which engage opposite sides of the pin end 66 so that when the piston 70 is reciprocated, the rod 65 is moved so that it rotates the drive member 60 through an acute angle.

The piston 70 is slidably mounted in a housing 74 secured to one end of the body 24, the piston 70 being engageable at one of its ends with a surface 76 in the housing 74 to limit movement of the piston 70 in one direction. A stop screw 78 mounted on the housing 74 is engageable with the opposite end of the piston to limit movement of the piston in an opposite direction. A passage 81 in the housing 74 is connected, by means of a hose fitting 82 to a source of fluid under pressure (not shown). When fluid under pressure is admitted to the passage 81, the piston 70 is rapidly driven in a direction toward the right as viewed in FIG. 3 until it engages the stop surface 76. This results in movement of the drive pin 65 so as to rotate the drive member 60 about the axis 30 through a predetermined acute angle. Movement of the drive member 60 in this direction provides for rotation of the one-way clutch unit 64 which in turn drives the spindle 38 so as to rotate the cam surface 42 in a direction to move the high ends 52 of the cam sections 44 and 46 toward the followers 54 and 56, respectively. As soon as the fluid pressure in the passage 81 is relieved, a spring 80 which bears against the surface 76 moves the piston 70 toward the left as viewed in FIG. 3 to return it to its stop position engaged with the stop screw 78. This movement of the piston 70 provides for a movement of the drive pin 65 in a reverse direction so as to in turn rotate the drive member 60 through a corresponding acute angle in the opposite direction. This rotation is transmitted by the key 62 to the one-way clutch unit 64 so as to rotate it in a reverse direction, but by virtue of its one-way nature, this rotation is not transmitted to the spindle 38. It can thus be seen, that periodic supply of fluid under pressure to the passage 81 will result in progressive rotation of the cam surface 42 through predetermined angle increments so as to progressively move the high ends 52 of the cam sections 44 and 46 toward the followers 54 and 56, respectively, to in turn incrementally advance the plunger 26 so as to deflect the deflectable tool support section 20.

An indicator flush pin 82 (FIG. 1) is provided for indicating visually when the cam followers 54 and 56 are at the low ends 50 of the cam surface sections 44 and 46. The pin 82 extends in a direction substantially perpendicular to the axis 30 and is urged inwardly toward the axis 30 by a spring 84 engaged with a retaining cap 86 in which the plunger 82 is slidably supported on the body 24. At its inner end 88, the flush pin 82 rides on the peripheral surface 90 of the spindle section 40. The surface 90 is configured so that when the followers 54 and 56 are at the low ends 50 of the cam surface sections 44 and 46, the pin 82 is in its inner position shown in solid lines in FIG. 1. However, when the spindle section 40 has been rotated approximately 180°to position the high ends 52 of the cam surface sections 44 and 46 in engagement with the followers 54 and 56, the pin 82 is moved outwardly against the pressure of the spring 84 to the dotted line position shown in FIG. 1. Thus, with the flush pin 82 in the position shown in solid lines in FIG. 1, the operator is assured that the spindle 38 is in the start position for tool compensation. When a new tool 12 is mounted on the support 16, spindle 38 is in this position and is automatically reset to this position by rotating the cam surface 42 so that the followers 54 and 56 drop off the high ends 52 of the cam sections and travel down the sections 53 to the low ends 50 of the cam sections.

It will be understood that the machine tool resetting apparatus which is herein disclosed and described in not intended to indicate limits of the invention, the scope of which is defined by the following claims.

What is claimed is:

1. In machine tool resetting apparatus for automatically moving a machine tool in a preestablished direction to compensate for tool wear, a body, plunger means having an axis and being mounted on said body for movement along said axis in said direction, spindle means rotatably mounted in said body in a substantially coaxial relation with said plunger means, coacting cam follower means on said spindle and plunger means providing for movement of said plunger means in said direction in response to rotation of said spindle means in one direction, means on said body operable to rotate said spindle means through a predetermined acute angle in said one direction, said means for rotating said spindle means including a drive member rotatably mounted on said body in a driving relation with said spindle means, a fluid actuated piston mounted on said body for axial reciprocal movement in a direction substantially perpendicular to the axis of rotation of said drive member, means extending between said piston and said drive member for rotating said drive member in response to axial movement of said piston comprising a pin member having a pair of ends, transversely extending abutments on said piston, one end of said pin member being disposed between and substantially engaged with said abutments and the other end of said pin member being secured to said drive member at a position spaced from the axis of rotation thereof.

2. In machine tool resetting apparatus for automatically moving a machine tool in a preestablished direction to compensate for tool wear, a body, plunger means having an axis and being mounted on said body for movement along said axis in said direction, spindle means rotatably mounted in said body in a substantially coaxial relation with said plunger means, coacting cam and cam follower means on said spindle and plunger means providing for movement of said plunger means in said direction in response to rotation of said spindle means in one direction, means on said body operable to rotate said spindle means through a predetermined acute angle in said one direction, said coacting cam and cam follower means including a circular cam surface substantially perpendicular to the axis of said plunger means, said surface being divided into arcuate half sections disposed on opposite sides of a diameter extending through said axis, each of said sections being sloped with respect to said axis, and a pair of cam follower members corresponding to and engaged with said sections, said follower members being substantially 180° apart with respect to said axis.

3. In machine tool resetting apparatus for automatically moving a machine tool in a preestablished direction to compensate for tool wear, a body, plunger means having an axis and being mounted on said body for movement along said axis in said direction, spindle means rotatably mounted in said body in a substantially coaxial relation with said plunger means, coacting cam and cam follower means on said spindle and plunger means providing for movement of said plunger means in said direction in response to rotation of said spindle means in one direction, means on said body operable to rotate said spindle means through a predetermined acute angle in said one direction, indicating means mounted on said body for reciprocal movement in a direction substantially perpendicular to the axis of said plunger means, and means operatively associated with said cam and cam follower means for moving said indicating means to an indicating position in response to movement of said cam and cam follower to predetermined relative positions.